(12) United States Patent
Sung et al.

(10) Patent No.: US 8,263,207 B2
(45) Date of Patent: Sep. 11, 2012

(54) GAS DIFFUSION LAYER, MANUFACTURING APPARATUS AND MANUFACTURING METHOD THEREOF

(75) Inventors: Lung-Yu Sung, Hsinchu County (TW); Kan-Lin Hsueh, Hsinchu County (TW); Yi-Yie Yan, Hsinchu (TW); Shu-Mei He, Hsinchu County (TW); Shi-Chern Yen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1211 days.

(21) Appl. No.: 11/954,244

(22) Filed: Dec. 12, 2007

(65) Prior Publication Data
US 2008/0166542 A1    Jul. 10, 2008

(30) Foreign Application Priority Data
Jan. 5, 2007 (TW) ................. 96100460 A

(51) Int. Cl.
*B32B 3/24* (2006.01)
*H01M 8/04* (2006.01)
(52) U.S. Cl. ............... 428/138; 428/137; 428/315.9; 429/413; 429/414; 429/514; 429/481
(58) Field of Classification Search .......... 428/138, 428/137; 429/413, 414, 514, 481
See application file for complete search history.

(56) References Cited

U.S. PATENT DOCUMENTS

| 751,095 A | 2/1904 | McAnulty et al. |
|---|---|---|
| 3,084,661 A | 4/1963 | Roberts et al. |
| 3,436,306 A | 4/1969 | Haberecht et al. |
| 4,470,859 A | 9/1984 | Benezra et al. |
| 4,609,562 A | 9/1986 | Isenberg et al. |
| 5,008,131 A | 4/1991 | Bakhshi |
| 5,268,062 A | 12/1993 | Darling, Jr. |
| 5,795,672 A | 8/1998 | Dearnaley |
| 5,814,567 A | 9/1998 | Yahiaoui et al. |
| 6,066,364 A | 5/2000 | Blass et al. |

(Continued)

FOREIGN PATENT DOCUMENTS

| CN | 1610155 | 4/2005 |
|---|---|---|
| CN | 1831196 | 9/2006 |
| WO | 2006025908 | 3/2006 |

OTHER PUBLICATIONS

"Office Action of Taiwan Counterpart Application" issued on Jul. 13, 2010, p. 1-p. 6, in which the listed references were cited.

(Continued)

*Primary Examiner* — William P Watkins, III
(74) *Attorney, Agent, or Firm* — Jianq Chyun IP Office

(57) ABSTRACT

A gas diffusion layer, a manufacturing apparatus and a manufacturing method thereof are provided. The gas diffusion layer having different hydrophilic/hydrophobic structure and channel therein can be manufactured quickly and easily by using a coating mask. The gas diffusion layer is used in various fuel cells to enhance the ability of water management and to solve the problem of flooding at the cathode, the problem of water deficit at the anode, and the problem of gas transfer. The gas diffusion layer includes a gas diffusion medium having a first property and a micro porous layer having a second property. The micro porous layer is formed on one surface of the gas diffusion medium. The micro porous layer has a plurality of channel layers penetrating the gas diffusion medium. One of the first property and the second property is hydrophilic, and the other is hydrophobic.

7 Claims, 7 Drawing Sheets

U.S. PATENT DOCUMENTS

| | | |
|---|---|---|
| 6,733,915 B2 | 5/2004 | Barton et al. |
| 6,821,661 B2 | 11/2004 | Haridoss et al. |
| 7,041,191 B2 | 5/2006 | Chen et al. |
| 2005/0064275 A1 | 3/2005 | Mekala et al. |
| 2005/0233080 A1 | 10/2005 | Ji et al. |
| 2006/0076342 A1 | 4/2006 | Watanabe et al. |
| 2006/0240312 A1* | 10/2006 | Xie et al. ........................ 429/42 |
| 2008/0020252 A1 | 1/2008 | Gao |

OTHER PUBLICATIONS

"Office Action of America Divisional Application", issued on Feb. 17, 2012, p. 1-p. 11, in which US0751095, US3084661, US3436306 and US20060076342 were cited.

"Office Action of America Divisional Application", issued on Feb. 10, 2012, p. 1-p. 12, in which US20080020252 was cited.

* cited by examiner

GAS DIFFUSION LAYER, MANUFACTURING APPARATUS AND MANUFACTURING METHOD THEREOF

CROSS-REFERENCE TO RELATED APPLICATION

This application claims the priority benefit of Taiwan application serial no. 96100460, filed on Jan. 5, 2007. All disclosure of the Taiwan application is incorporated herein by reference.

BACKGROUND OF THE INVENTION

1. Field of the Invention

The present invention relates to a fuel cell. More precisely, the present invention relates to a gas diffusion layer of a fuel cell, a manufacturing apparatus and a manufacturing method thereof.

2. Description of Related Art

Along with the industrial development, the consumption of the conventional energy resources such as coal, petroleum, and natural gas continuously increases. Since the reservations of these resources are limited, new alternative energy technology should be developed to substitute the conventional method of energy consumption. The fuel cell is an important new alternative energy technology with practical value.

Briefly speaking, the fuel cell basically is a generator apparatus that uses the reverse reaction of the water electrolysis to convert chemical energy into electric energy. Since the fuel cell has the advantages of low operation temperature, quick start, high energy density, low pollution, and a wide range of application, the fuel cell has a high commercial value. It has become a successively developed and promoted technology all over the world. The commonly seen fuel cell includes phosphoric acid fuel cell (PAFC), direct methanol fuel Cell (DMFC), alkaline fuel cell (AFC), molten carbonate fuel cell (MCFC), solid oxide fuel cell (SOFC), and proton exchange membrane fuel cell (PEMFC).

FIG. 1A is a cross-sectional view of an internal structure of a typical proton exchange membrane fuel cell (PEMFC). As shown in FIG. 1A, the PEMFC mainly includes a proton exchange membrane (PEM) 100, a catalyst layer 102, a gas diffusion layer (GDL) 104, and a bipolar plate 106. During the PEMFC operation, the oxidation reaction of $H_2$ is taking placed at the anode 110, and the reduction reaction of $O_2$ is taking placed at the cathode 112. The reactant gas $H_2$ at the anode 110 is decomposed into hydrogen ions ($H^+$) and electrons ($e^-$) in the presence of a catalyst, as shown in Equation (1). The electrons ($e^-$) escape from the anode 110. It flows through the cell external circuit 114 and load 115, then it reaches the cathode 112. Meanwhile, the hydrogen ions ($H^+$) are transferred from the anode 110 to the cathode 112 through the proton exchange membrane (PEM) 100. The hydrogen ions ($H^+$) and the electrons ($e^-$) combine with the oxygen molecules ($O_2$) at the cathode 112 to produce water ($H_2O$), as shown in Equation (2). Therefore, the overall reaction of the entire fuel cell is: $H_2$ reacts with $O_2$ to produce $H_2O$, as shown in Equation (3).

At the anode: $H_2 \rightarrow 2H^+ + 2e^-$     (1),

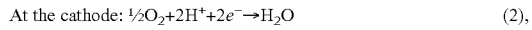
At the cathode: $\frac{1}{2}O_2 + 2H^+ + 2e^- \rightarrow H_2O$     (2),

Overall reaction: $H_2 + \frac{1}{2}O_2 \rightarrow H_2O$     (3).

The hydrogen ions ($H^+$) are produced at the anode 110. Due to the electrical field in the cell, the $H^+$ is migrated from the anode toward the cathode 112 continuously. During the $H^+$ migration, it drags water molecules ($H_2O$) along to the cathode 112 (i.e., osmosis drag of water, the $H^+$ is migrated in the form of a hydrated ion $H^+(H_2O)_n$). Therefore, during the cell reaction, the $H_2O$ molecules will be continuously transferred from the anode 110 to the cathode 112. If the water cannot be supplied at adequate amount, the proton exchange membrane (PEM) 100 will become excessively dry, the $H^+$ conducting capability of the membrane will be reduced, and the power output of the fuel cell will be significantly reduced. However, a great amount of water ($H_2O$) will be produced by the reduction reaction of $O_2$ at the cathode 112. If the extra water cannot be adequate discharged from the cell, the catalyst layer 102 and the gas diffusion layer 104 at the cathode 112 will be flooded and filled with water. The gas diffusion layer filled with water becomes a diffusion barrier of oxygen. It retards the oxygen getting into the catalyst layer and the cell output power is significantly reduced. Therefore, the requirement on the water management condition at the cathode 112 and that at the anode 110 of the fuel cell are significantly different from each other. Controlling and maintaining of the water balance in the cathode 112 and the anode 110 and keeping the gas transferring freely inside the electrodes, are critical for maintaining the performance of the PEMFC at its optimal condition.

The gas diffusion layer 104 is located between the catalyst layer 102 and the gas flow path 108. It is one of the key components of the fuel cell in the determination of the water balance in the fuel cell. A good gas diffusion layer shall maintain the catalyst layer and membrane at adequate moisture for high ionic conductivity and keep itself at dry condition for good gas diffusion pathway.

FIG. 1B is a schematic view of the internal structure of a gas diffusion layer. As shown in FIG. 1B, the gas diffusion layer 104 has a dual-layer structure therein, one layer is a gas diffusion medium (GDM) 104a. It is a macro-porous carbon fiber substrate. The other one is a micro porous layer (MPL) 104b. It is a micro-porous carbon powder substrate. The MPL is coated on the GDM by a particular manufacturing method. This method usually uses an ultrasonic oscillator to mix highly conductivity carbon powders, dispersing agents, a solution, and a hydrophile/hydrophobicizer, so as to produce a liquid micro porous layer slurry. This slurry is then using a coating technique to coat the micro porous layer slurry on the surface of the gas diffusion medium 104a. After a high temperature sintering, the micro porous layer 104b is obtained.

The gas diffusion layer 104 plays many roles in the fuel cell stack, such as (1) providing a pathway for the reactant gas ($H_2$, $O_2$); (2) providing a pathway for the reaction products (water, heats) to leave the catalyst layer; (3) providing a conducting medium for the electrons current; and (4) acting as a structural support for the catalyst layer and the PEM. Therefore, the gas diffusion layer 104 should have all the characteristics of electric conductivity, thermal conductivity, porosity, gas permeability, hydrophilicity/hydrophobicity, and mechanical strength. As described above, during the reaction of the PEMFC, many water molecules ($H_2O$) are required for the $H^+$ to migrate from the anode 110 to the cathode 112. So that the gas diffusion layer of a hydrophilic material is suitable for being used at the anode 110. A great amount of water ($H_2O$) will be produced by the reduction reaction of $O_2$ at the cathode 112, so that the gas diffusion layer of a hydrophobic material is suitable for being used at the cathode 112. If both the transference of the reactant gases ($H_2$, $O_2$) and the discharge of the water ($H_2O$) should be taken into consideration, the gas diffusion layer made of combining different hydrophilic/hydrophobic materials can be used.

Based on the above, the hydrophilic/hydrophobic structure of the gas diffusion layer 104 is the critical factor for affecting the water balance in the fuel cell.

The conventional manufacturing method of the gas diffusion layer only adopts a surface coating process to form a micro porous layer on the surface of the gas diffusion medium, without forming different hydrophilic/hydrophobic structures and channel layers in the gas diffusion medium (GDM). Moreover, the micro porous layer (MPL) has a poor adhesion with the gas diffusion medium, which is easily stripped off. Moreover, the gas diffusion layer cannot meet the requirements on both the high gas permeability/high hydrophilicity and the high gas permeability/high electric conductivity. The gas diffusion layer (GDL) usually has a low electric conductivity at the through plane.

SUMMARY OF THE INVENTION

The present invention provides a gas diffusion layer, a manufacturing apparatus and a manufacturing method thereof. A plurality channel layers are formed in a gas diffusion medium, which have a hydrophilicity/hydrophobicity different from that of the gas diffusion medium, so as to solve the problem of flooding at the cathode, the problem of water deficit at the anode, and the problem of gas transfer for the fuel cell at the same time, and thus improving the power-generating performance and prolonging the service life of the fuel cell.

The present invention provides a gas diffusion layer, a manufacturing apparatus and a manufacturing method thereof, which uses a coating mask and a vacuum system. When a micro porous layer slurry is coated on a gas diffusion medium, a plurality of channel layers are formed in the gas diffusion medium, which have a hydrophilicity/hydrophobicity different from that of the gas diffusion layer, and the gas diffusion layer having different hydrophilicity/hydrophobicity combinations can be manufactured quickly by changing the pattern design of the coating mask.

The present invention provides a gas diffusion layer of a fuel cell, a manufacturing apparatus and a manufacturing method thereof. By means of disposing a heating apparatus, the heating and sintering process can be performed while the micro porous layer slurry is coated. Therefore, the solution in the slurry can be removed quickly, so as to from a micro porous layer and a plurality of channel layers.

The present invention provides a gas diffusion layer of a fuel cell, a manufacturing apparatus and a manufacturing method thereof. Since part of the micro porous layer is penetrate into the gas diffusion medium, and has a 3-D channel structure, the adhesion between the micro porous layer and the gas diffusion medium can be greatly enhanced, and thus, the micro porous layer is not easily stripped off.

The present invention provides a gas diffusion layer of a fuel cell, a manufacturing apparatus and a manufacturing method thereof. Besides one or more micro porous layers formed on the surface of the gas diffusion medium, a conductive channel is also formed in the through-plane direction by penetrating the micro porous layer into the gas diffusion medium. Therefore, the conductivity at the in-plane and the through-plane of the gas diffusion layer can be greatly improved.

The present invention provides a gas diffusion layer, which includes a gas diffusion medium having a first property and a micro porous layer having a second property. The first micro porous layer having the second property is formed on one surface of the gas diffusion medium, and the first micro porous layer has a plurality of channel layers penetrating through the gas diffusion medium. One of the first property and the second property is hydrophilic, and the other is hydrophobic.

In the gas diffusion layer of the present invention, since the micro porous layer has the channel layers penetrating into the gas diffusion medium and having a 3-D structure, the adhesion between the micro porous layer and the gas diffusion medium can be greatly enhanced, and thus, the micro porous layer is not easily stripped off.

In the gas diffusion layer of the present invention, besides one or more micro porous layers formed on the surface of the gas diffusion medium, channel layers served as conductive channels in the through-plane direction are further formed by penetrating the micro porous layer into the gas diffusion medium. Therefore, the conductivity at the in plane and the through plane of the gas diffusion layer can be greatly improved.

The gas diffusion layer of the present invention forms a plurality channel layers having a hydrophilicity/hydrophobicity different from that of the gas diffusion medium in the gas diffusion medium, so as to solve the problem of flooding at the cathode, the problem of water deficit at the anode, and the problem of gas transfer for the fuel cell, and thus enhancing the power-generating performance and prolonging the service life of the fuel cell.

The present invention provides a manufacturing apparatus of the gas diffusion layer for forming a micro porous layer having a plurality of channel layers on a gas diffusion medium. The manufacturing apparatus of the gas diffusion layer includes a vacuum system, a coating mask, and a heating apparatus. The vacuum system includes a vacuum chamber body and a vacuum pump. The vacuum chamber body has an opening. The vacuum pump is connected to the vacuum chamber body, so as to produce a vacuum suction in the vacuum chamber body. The coating mask is disposed on the opening of the vacuum chamber body, and has a plurality of through holes therein. The heating apparatus is disposed in the coating mask. After the gas diffusion medium is disposed on the coating mask, and the micro porous layer slurry is coated on the gas diffusion medium, the gas diffusion medium is fixed and part of the micro porous layer slurry is penetrated into the gas diffusion medium under the effect of the vacuum suction, and then, the heating apparatus is used to remove the solution in the micro porous layer slurry, so as to form the micro porous layer having channel layers.

Since the manufacturing apparatus of the gas diffusion layer has the coating mask and the vacuum system, the gas diffusion layer having channel layers formed in the gas diffusion medium (GDM) is easily manufactured, and the hydrophilicity/hydrophobicity of the channel layers is different from that of the gas diffusion medium. Moreover, the gas diffusion layer having different hydrophilicity/hydrophobicity combinations can be produced quickly by changing the pattern design of the through holes for the coating mask.

Since the manufacturing apparatus of the gas diffusion layer has a heating apparatus, the heating and sintering process can be performed while the micro porous layer slurry is coated. Therefore, the solution in the slurry can be removed quickly, and the micro porous layer structure and the channel layers can be formed quickly.

The present invention provides a manufacturing method of the gas diffusion layer, which includes the following steps. Firstly, a coating mask is provided, which has a plurality of through holes therein. Next, a gas diffusion medium is disposed on the coating mask, and a first micro porous layer slurry is formed on the gas diffusion medium. Then, a penetrating step is performed, to make the first micro porous layer slurry penetrate into the gas diffusion medium and run through the gas diffusion medium, and the part of the gas diffusion medium where the first micro porous layer slurry penetrates through is corresponding to the through holes of the coating mask. Then, a first heating and sintering step is performed to remove the solution in the first micro porous layer slurry, so as to form a first micro porous layer having a plurality of channel layers.

Since the manufacturing method of the gas diffusion layer of the present invention adopts a coating mask, channel layers having hydrophilicity/hydrophobicity different from that of the gas diffusion medium (GDM) is easily formed in the gas diffusion medium (GDM). Moreover, the gas diffusion layer having different hydrophilicity/hydrophobicity combinations can be produced quickly by changing the pattern design for the coating mask.

In the manufacturing method of the gas diffusion layer of the present invention, the coating step of the micro porous layer slurry, the penetrating step of the micro porous layer slurry and the heating and sintering step can be performed at the same time, so that the micro porous layer structure and the channel layers can be formed quickly. This manufacturing method is not only simple, but also saves the manufacturing time.

In order to make the aforementioned and other objectives, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a gas diffusion layer of a fuel cell, a manufacturing apparatus and a manufacturing method thereof. First of all, one or more layers of micro porous layer slurry are coated on the gas diffusion medium (GDM), and the micro porous layer slurry is made to penetrate into the gas diffusion medium. After the drying and sintering process, the gas diffusion layer structure with a plurality channel layers having hydrophilicity/hydrophobicity different from that of a gas diffusion medium is formed in the gas diffusion medium. The "hydrophilicity/hydrophobicity" stands for hydrophilicity or hydrophobicity.

Figure 1A:
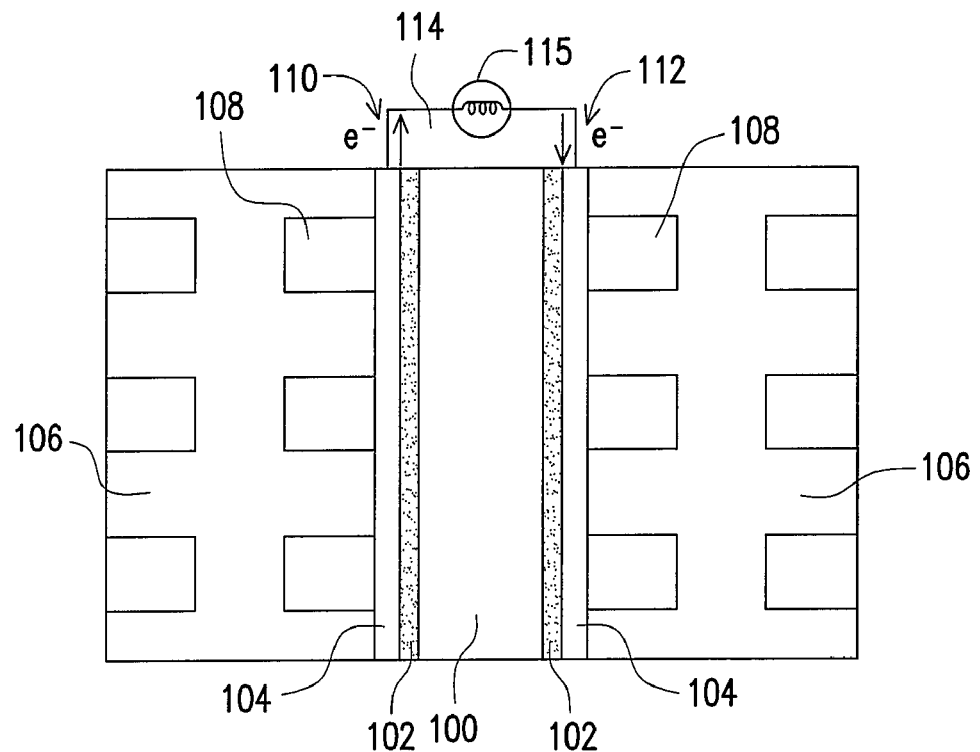
FIG. 1A is a sectional view of an internal structure of a typical proton exchange membrane fuel cell (PEMFC).
Figure 1B:
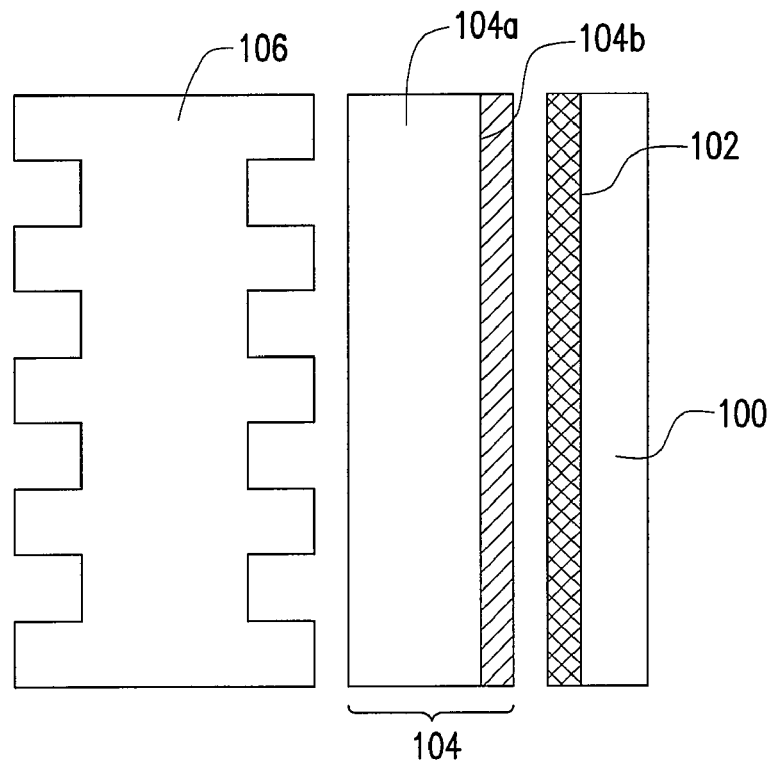
FIG. 1B is a schematic view of an internal structure of a gas diffusion layer.
Figure 2A:
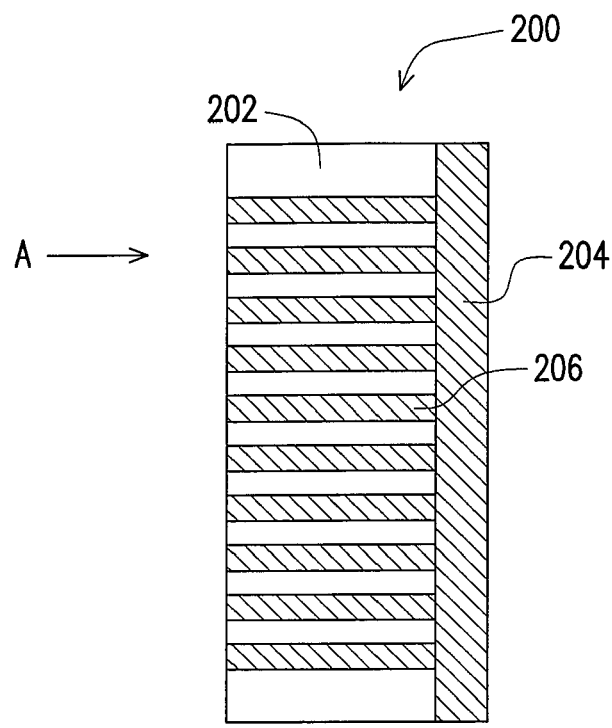
FIG. 2A is a sectional view of a gas diffusion layer according to a preferred embodiment of the present invention.

First of all, the gas diffusion layer of the present invention is illustrated. FIG. 2A is a sectional view of a gas diffusion layer according to a preferred embodiment of the present invention.

As shown in FIG. 2A, the gas diffusion layer 200 is, for example, formed by a gas diffusion medium 202 having a first property, and a micro porous layer 204 having a second property. One of the first property and the second property is hydrophilic, and the other is hydrophobic. For example, if the gas diffusion medium 202 is hydrophilic, the micro porous layer 204 is hydrophobic; and if the gas diffusion medium 202 is hydrophobic, the micro porous layer 204 is hydrophilic.

The material of the gas diffusion medium 202 includes, for example, a porous material, such as carbon paper, carbon cloth, carbon fiber material, metal foams, or metal netting. A hydrophilic process or a hydrophobic process is, for example, performed on the gas diffusion medium 202, so that the gas diffusion medium 202 is hydrophilic or hydrophobic.

The micro porous layer 204 is disposed on one surface of the gas diffusion medium 202, and the micro porous layer 204 has a plurality of channel layers 206 penetrating through the gas diffusion medium 202. That is, the channel layers 206 are the part extending from the micro porous layer 204. The channel layers 206 have the hydrophilicity/hydrophobicity different from that of the gas diffusion medium 202. The micro porous layer 204 (including the channel layers 206) is formed by the micro porous layer slurry with the solution being removed. The micro porous layer slurry includes a carbon material having a high conductivity, a dispersing agent, a solution and a hydrophile/hydrophobicizer. The hydrophilicity or hydrophobicity of the micro porous layer 204 can be controlled through the proportion of the hydrophile/hydrophobicizer in the micro porous layer slurry. Definitely, the micro porous layer slurry further includes a noble metal catalyst, such as Pt, Au, Ru, Rh, Pd, Pt—Ru or Pt-transient metal alloys. The Pt-transient metal alloys include Pt—Ru, Pt—Sn, Pt—Ru—W, Pt—Co, and Pt—Ru—Sn.

Figure 2B:
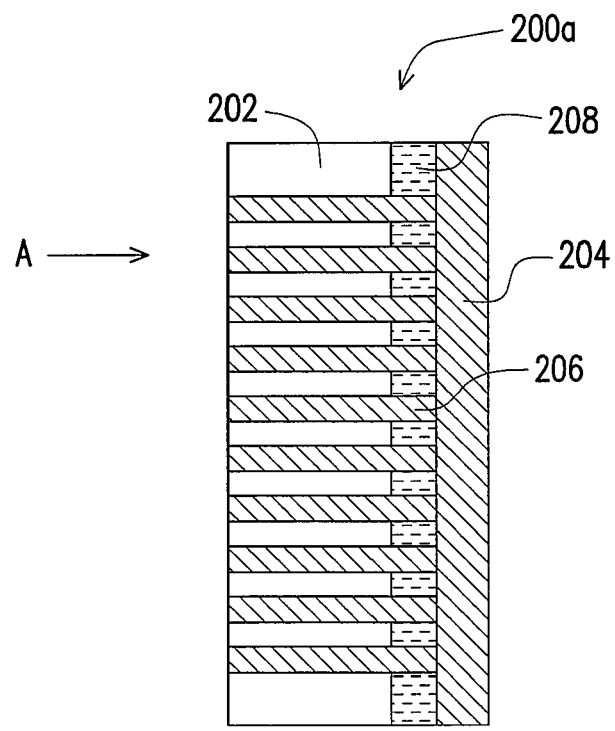
FIG. 2B is a sectional view of a gas diffusion layer according to another preferred embodiment of the present invention.
Figure 3A:
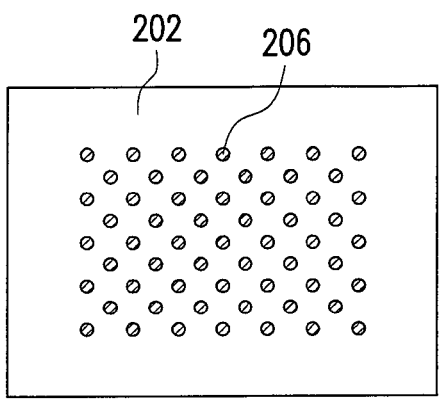
FIGS. 3A to 3F are respectively side views of the gas diffusion layer seen from the direction A in FIG. 2A or 2B.
Figure 3B:
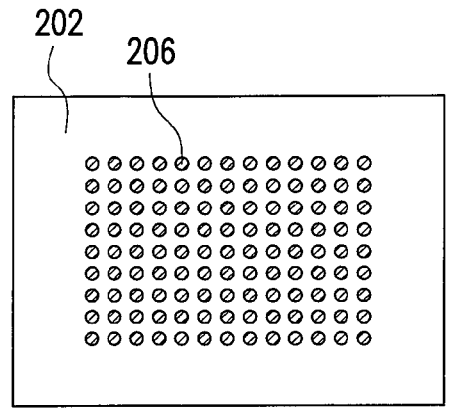
Figure 3C:
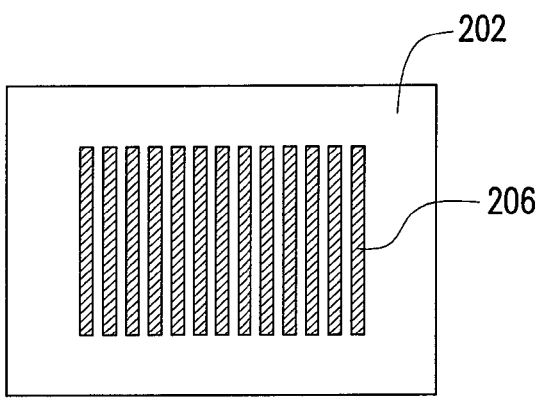
Figure 3D:
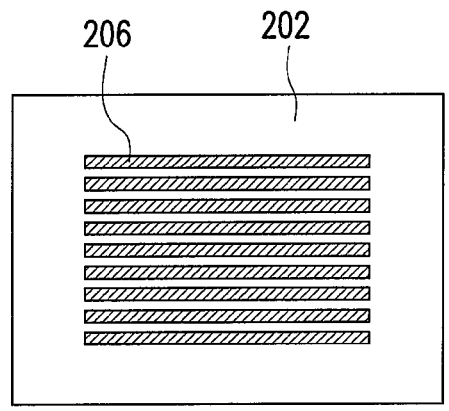
Figure 3E:
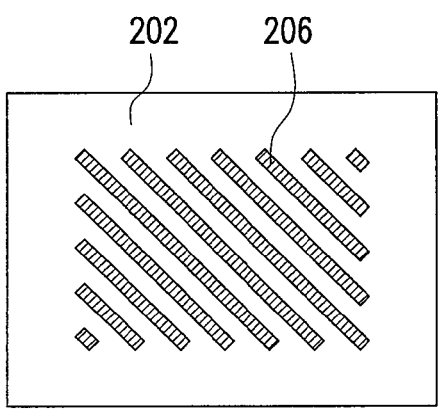
Figure 3F:
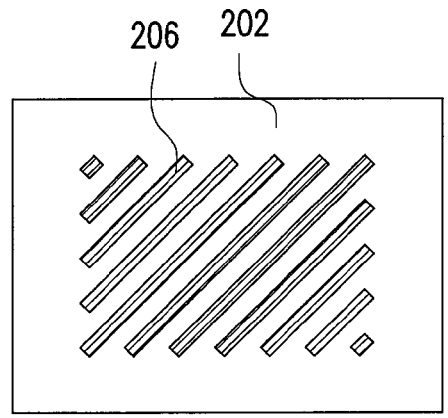

FIG. 2B is a sectional view of a gas diffusion layer according to another preferred embodiment of the present invention. In FIG. 2B, the same numerals are designated to the same means in FIG. 2A, and the detailed illustration is omitted herein, but only the differences are illustrated.

As shown in FIG. 2B, the gas diffusion layer 200a further includes a micro porous layer 208 having a first property. The micro porous layer 208 is disposed on the surface of the gas diffusion medium 202, and located between the gas diffusion medium 202 and the micro porous layer 204. The micro porous layer 208 has the hydrophilicity/hydrophobicity same as that of the gas diffusion medium 202. For example, if the gas diffusion medium 202 and the micro porous layer 208 are hydrophilic, the micro porous layer 204 is hydrophobic; and if the gas diffusion medium 202 and the micro porous layer 208 are hydrophobic, the micro porous layer 204 is hydrophobic. Likewise, the micro porous layer 208 is also formed by the micro porous layer slurry with the solution being removed. The gas diffusion layers 200 and 200a of the present invention can be used in a phosphoric acid fuel cell (PAFC), a direct methanol fuel cell (DMFC), or a proton exchange membrane fuel cell (PEMFC).

FIGS. 3A to 3F are respectively side views of the gas diffusion layer seen from the direction A in FIG. 2A or 2B. As shown in FIGS. 3A to 3F, the channel layers 206 within the gas diffusion medium 202 are, for example, arranged regularly, which definitely also can be arranged irregularly. The sizes and shapes of the channel layers 206 on the same gas diffusion medium 202 can be the same or different from each other. The cross section of the channel layers 206 is, for example, round (shown in FIGS. 3A and 3B) or rectangular (shown in FIGS. 3C to 3F), and the cross section of the channel layer 206 can also be, for example, polygon (such as triangle, pentagon), ellipse, or an irregular shape.

Figure 4A:
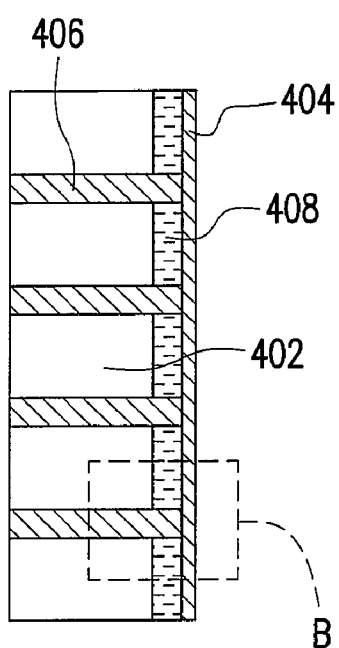
FIG. 4A is a sectional view of a gas diffusion layer according to a preferred embodiment of the present invention.
Figure 4B:
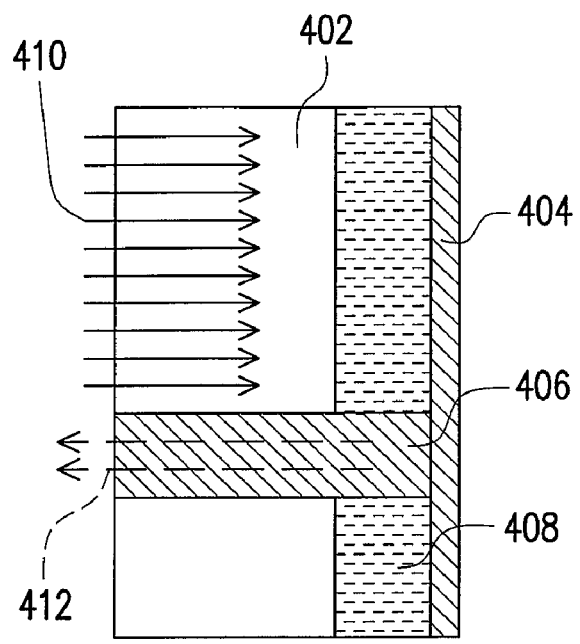
FIG. 4B is an enlarged view of part B in FIG. 4A.
Figure 4C:
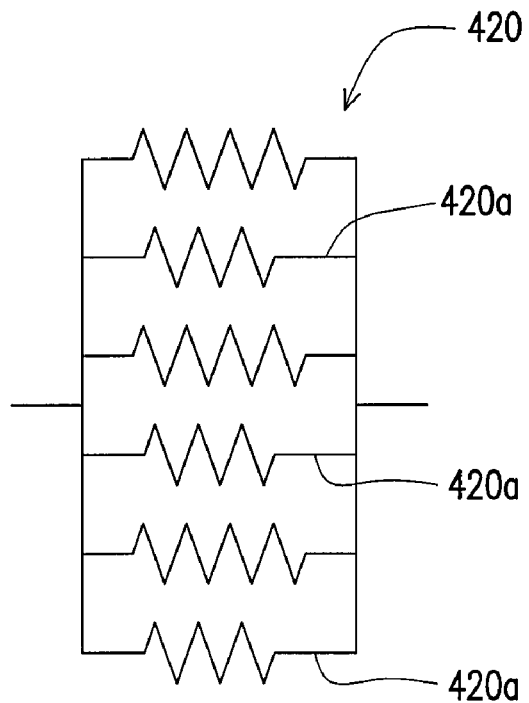
FIG. 4C is a parallel-connected circuit diagram for equivalent resistors of the gas diffusion layer according to the present invention.

FIG. 4A is a sectional view of a gas diffusion layer according to a preferred embodiment of the present invention. FIG. 4B is an enlarged view of part B in FIG. 4A. FIG. 4C is a parallel-connected circuit diagram of equivalent resistors of the gas diffusion layer according to the present invention.

As shown in FIGS. 4A and 4B, a hydrophobic micro porous layer 408 and a hydrophilic micro porous layer 404 are formed on the hydrophobic gas diffusion medium 402 by means of a dual-layer coating process. The hydrophilic micro porous layer 404 has hydrophilic channel layers 406 penetrating through the hydrophobic micro porous layer 408 and the hydrophobic gas diffusion medium 402. Through the hydrophilic micro porous channel layers 406 in the hydrophobic gas diffusion medium 402, the water around is absorbed into the hydrophilic micro porous channel layers 406 by the capillary effect to form a liquid communication channel 412 and a gas communication channel 410 for maintaining the nearby hydrophobic gas diffusion medium 402 to be fluent and smooth.

Generally, the hydrophobic process of the gas diffusion layer will reduce the electric conductivity of the diffusion layer. However, the gas diffusion layer structure provided by the present invention can enhance the electric conductivity of the gas diffusion layer. In the hydrophobic gas diffusion medium, the channel layers formed by the carbon powder can provide an additional channel for current, so as to reduce the resistance of the gas diffusion layer. As shown in FIG. 4C, the additional carbon powder channel is equivalent to a low resistance channel 420a formed in the parallel-connected circuit for equivalent resistors of the gas diffusion layer, so as to improve the electric conductivity of the gas diffusion layer. Otherwise, the low resistance channel 420a is used to provide the path of current, so that the hydrophobicity for other parts of the gas diffusion layer is enhanced, and the diffusion layer gains a preferred gas diffusivity.

In general, depending upon various different water management requirements and objectives, the gas diffusion layers having different hydrophilicity/hydrophobicity can be used correspondingly, so as to significantly improve the water management capability of the fuel cell, and also solve the problem of flooding at the cathode, the problem of water deficit at the anode, and the problem of gas transfer of the fuel cell at the same time, and thus enhancing the power-generating performance and prolonging the service life of the fuel cell.

In the gas diffusion layer of the present invention, since the micro porous layer (MPL) has the channel layers penetrating into the gas diffusion medium (GDM) and having a 3-D structure, the adhesion between the micro porous layer (MPL) and the gas diffusion medium (GDM) can be greatly increased, and thus, the micro porous layer is not easily stripped off.

Besides one or more micro porous layers (MPL) formed on the surface of the gas diffusion medium (GDM), the gas diffusion layer of the present invention further has the channel layers served as conductive channels in the through-plane direction and formed by penetrating the micro porous layer into the gas diffusion medium (GDM). Therefore, the conductivity at the in plane and the through plane of the gas diffusion layer can be greatly improved through the channel layers.

The gas diffusion layer of the present invention forms the channel layers in the gas diffusion medium, which has a hydrophilicity/hydrophobicity different from that of the gas diffusion medium, so as to solve the problem of flooding at the cathode, the problem of water deficit at the anode, and the problem of gas transfer of the fuel cell, and thus, enhancing the power-generating performance and prolonging the service life of the fuel cell.

Figure 5A:
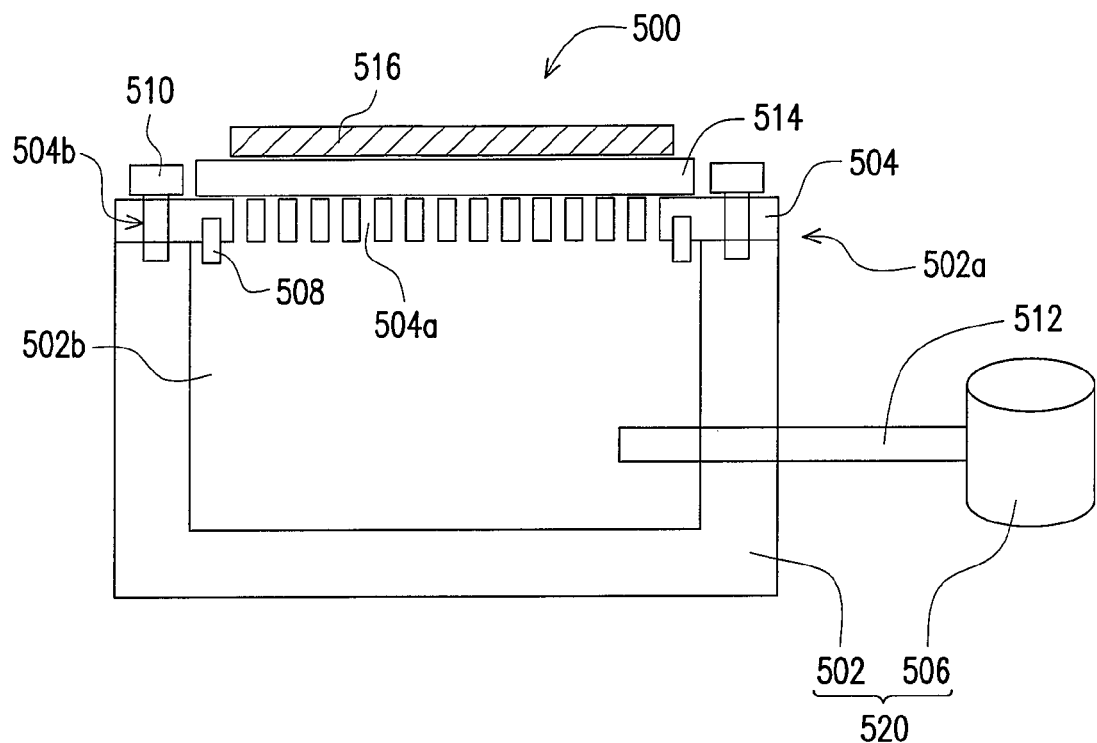
FIG. 5A shows a manufacturing apparatus for a gas diffusion layer according to a preferred embodiment of the present invention.
Figure 5B:
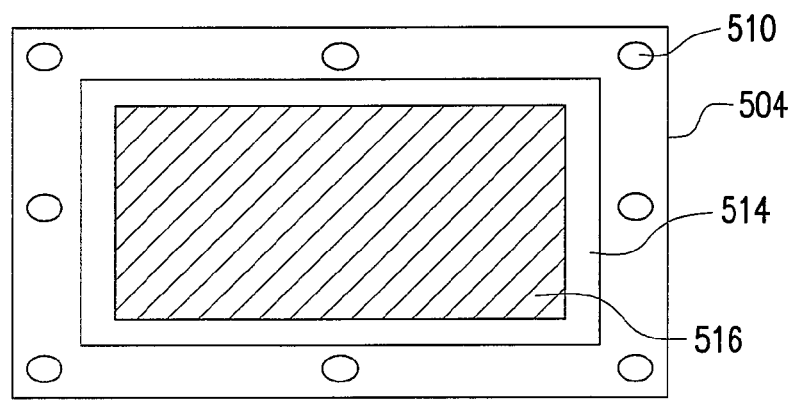
FIG. 5B is a top view of a manufacturing apparatus for a gas diffusion layer disposed with a gas diffusion medium and micro porous layer slurry according to a preferred embodiment of the present invention.
Figure 6A:
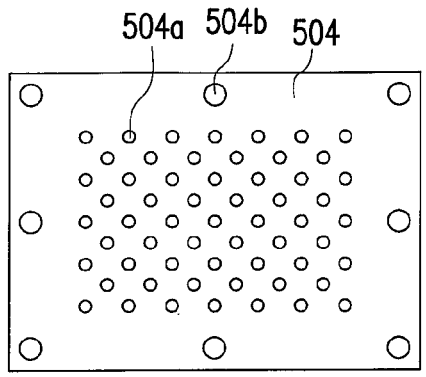
FIGS. 6A to 6F are respectively top views of a coating mask according to a preferred embodiment of the present invention.
Figure 6B:
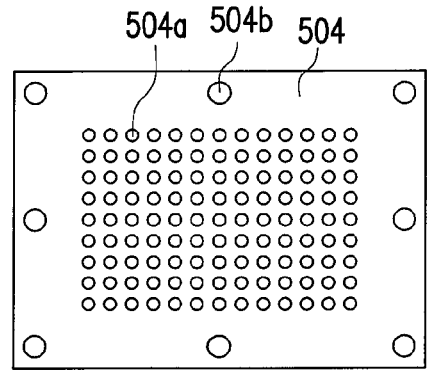
Figure 6C:
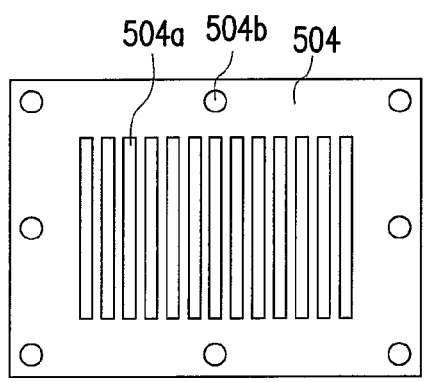
Figure 6D:
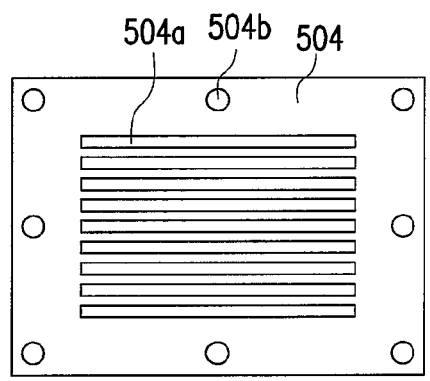
Figure 6E:
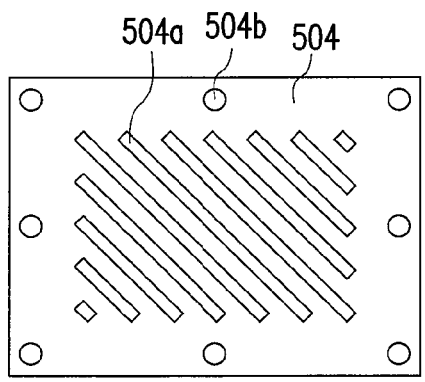
Figure 6F:
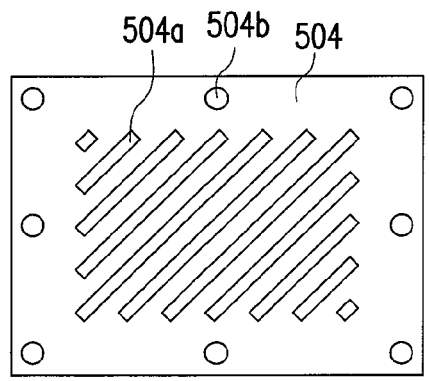

Then, the manufacturing apparatus of the gas diffusion layer of the present invention is illustrated. FIG. 5A is a sectional view of a manufacturing apparatus for a gas diffusion layer according to a preferred embodiment of the present invention. FIG. 5B is a top view of a manufacturing apparatus for a gas diffusion layer disposed with a gas diffusion medium and a micro porous layer slurry according to a preferred embodiment of the present invention. FIGS. 6A to 6F are respectively top views of a coating mask according to a preferred embodiment of the present invention.

Referring to FIGS. 5A and 5B, the manufacturing apparatus 500 for the gas diffusion layer includes, for example, a vacuum system 520, a coating mask 504, and a heating apparatus 508. A gas diffusion medium 514 is disposed on the coating mask 504, and the micro porous layer slurry 516 is coated on the gas diffusion medium 514.

The vacuum system 520 is formed by, for example, a vacuum chamber body 502 and a vacuum pump 506. An opening 502a is, for example, disposed on one end of the vacuum chamber body 502.

The vacuum pump 506 is connected to the vacuum chamber body 502, so as to produce a vacuum suction in the inner part 502b of the vacuum chamber body 502, and under the vacuum suction, the gas diffusion medium 514 is fixed and the micro porous layer slurry 516 can penetrate into the gas diffusion medium quickly. That is, through the vacuum suction, the micro porous layer slurry 516 located above the through hole 504a of the coating mask 504 penetrates downwards to form a plurality of channel layers. Therefore, a pattern constituted by the channel layers depends upon a pattern constituted by the through holes 504a of the coating mask 504. The vacuum pump 506 is, for example, connected to the vacuum chamber body 502 through a vacuum pipe fitting 512.

The coating mask 504 is, for example, disposed on the opening 502a of the vacuum chamber body 502. The coating mask 504 has a plurality of through holes 504a therein. A plurality of screw holes 504b are, for example, disposed around the coating mask 504, and thus, the coating mask 504 is fixed on the opening 502a of the vacuum chamber body 502 through the plurality of screws 510. Moreover, as shown in FIGS. 6A to 6F, the through holes 504a of the coating mask 504 are, for example, arranged regularly. Of course, the through holes 504a may also be arranged irregularly. The sizes and shapes of the through holes 504*a* on the same coating mask 504 can be the same or different from each other. The cross section of the through hole 504*a* of the coating mask 504 is, for example, round (shown in FIGS. 6A and 6B) or rectangular (shown in FIGS. 3C to 3F). Of course, the cross section of the through hole 504*a* may also be, for example, polygon (such as triangle, pentagon), ellipse or an irregular shape. The material of the coating mask 504 is, for example, metal, rubber, plastic or ceramic. The coating mask 504 has through holes 504*a* with different sizes and shapes on the surface, which are not only used for fixing the gas diffusion medium 514, but also used for forming the channel layers in the gas diffusion medium 514, in which the channel layers have a hydrophilicity/hydrophobicity different from that of the gas diffusion medium 514.

The heating apparatus 508 is, for example, disposed in the coating mask 504, such that the heating and sintering process can be performed while coating the micro porous layer slurry 516, and thus, the solution in the micro porous layer slurry 516 can be removed quickly to form the micro porous layer structure and the channel layers.

Then, the operations of the manufacturing apparatus for the gas diffusion layer of the present invention are illustrated below. Referring to FIG. 5A, the coating mask 504 is fixed on the opening 502*a* of the vacuum chamber body 502 through the screws 510. Then, the gas diffusion medium 514 is placed on the coating mask 504, and meanwhile, the vacuum pump 506 and the heating apparatus 508 on the coating mask 504 are started. At this time, the gas diffusion medium 514 is fixed on the coating mask 504 under the vacuum suction produced by the vacuum pump 506, and the gas diffusion medium 514 is also heated by the heating apparatus 508. When the gas diffusion medium 514 reaches the required temperature, the micro porous layer slurry 516 is coated on the gas diffusion medium 514 by means of a coating technique (such as spraying coating, blade coating, screen printing). The micro porous layer slurry 516 not only forms a coating layer on the surface of the gas diffusion medium 514, but also penetrates into the gas diffusion medium 514 according to the pattern constituted by the through holes 504*a* of the coating mask 504, and run through the gas diffusion medium 514 due to the vacuum suction. Therefore, the part of the gas diffusion medium 514 where the micro porous layer slurry 516 penetrates through is corresponding to the through holes 504*a* of the coating mask 504. Since the heating apparatus 508 is disposed on the coating mask 504, the heating and sintering process can be performed while coating the micro porous layer slurry 514, so as to remove the solution in the micro porous layer slurry, and thus forming the micro porous layer and the channel layers quickly. In this embodiment, the step of forming the micro porous layer slurry 516 on the gas diffusion medium 514, the step of penetrating the micro porous layer slurry 516 into the gas diffusion medium 514, and the heating and sintering steps are performed at the same time. Definitely, the step of forming the micro porous layer slurry 516 on the gas diffusion medium 514, the step of penetrating the micro porous layer slurry 516 into the gas diffusion medium 514, and the heating and sintering step can also be performed separately. For example, after the micro porous layer slurry 516 has been formed on the gas diffusion medium 514, the vacuum pump 506 and the heating apparatus 508 are started, and then, the step of penetrating the micro porous layer slurry 516 into the gas diffusion medium 514, and the heating and sintering step are performed.

The manufacturing apparatus for the gas diffusion layer of the present invention has the coating mask and the vacuum system, so that it is easy to manufacture a gas diffusion layer with channel layers formed in the gas diffusion medium (GDM). The channel layers have a hydrophilicity/hydrophobicity different from that of the gas diffusion medium. Moreover, by changing the pattern design for the through hole of the coating mask, the gas diffusion layer having different hydrophilicity/hydrophobicity combinations can be produced quickly.

Since the manufacturing apparatus for the gas diffusion layer of the present invention has a heating apparatus, the heating and sintering process can be performed while the micro porous layer slurry is coated. Therefore, the solution in the micro porous layer slurry can be removed quickly, and thus, the micro porous layer structure and the channel layers can be formed quickly.

Figure 7:
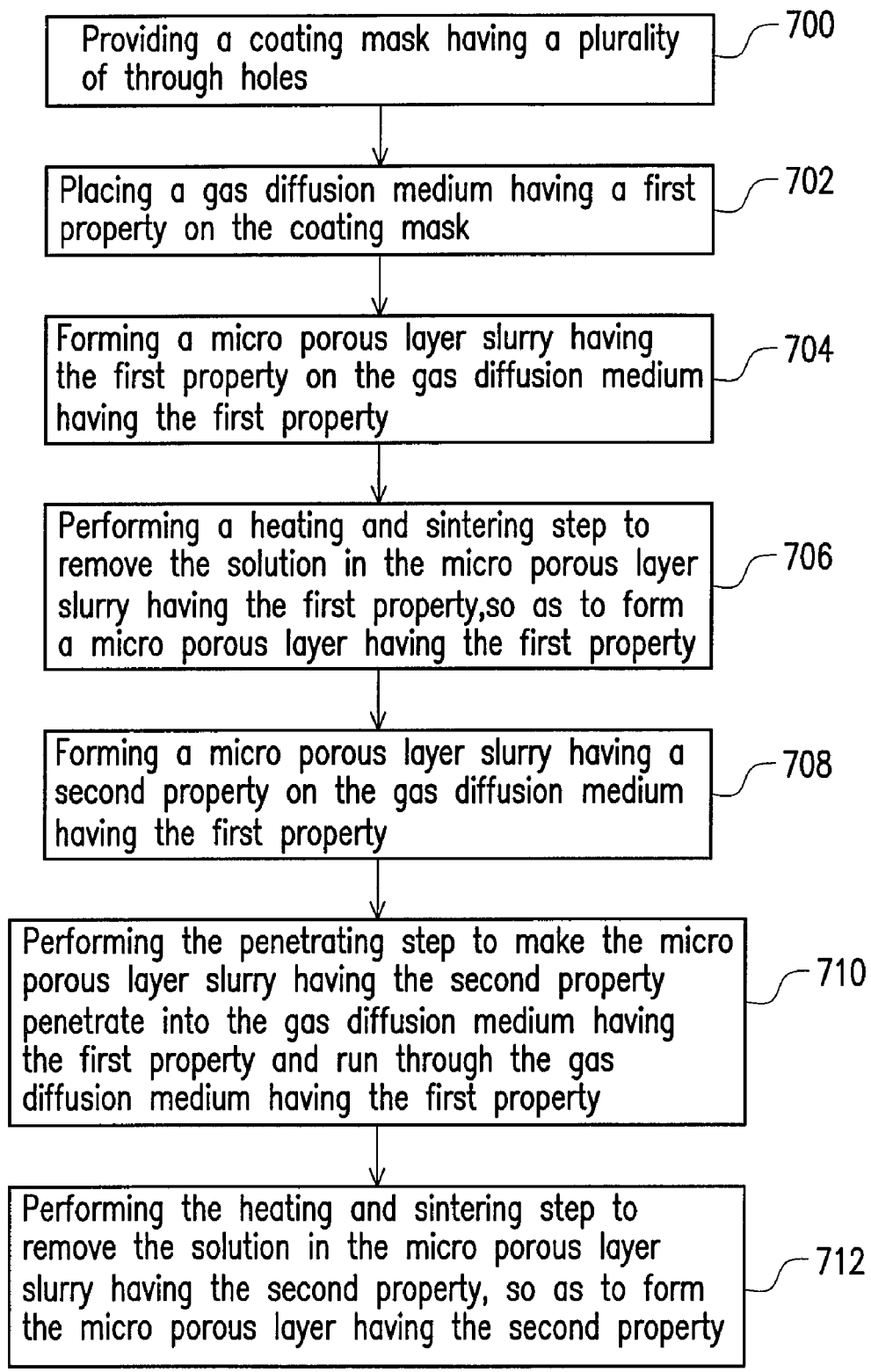
FIG. 7 is a flow chart of a manufacturing method for a gas diffusion layer according to a preferred embodiment of the present invention.

Then, the manufacturing method for the gas diffusion layer of the fuel cell in the present invention is illustrated. FIG. 7 is a flow chart of a manufacturing method for a gas diffusion layer according to a preferred embodiment of the present invention. In this embodiment, the manufacturing of the gas diffusion layer in FIG. 2B is taken as an example for illustration. Moreover, in the following illustration, one of the first property and the second property is hydrophilic, and the other is hydrophobic. For example, if the first property is hydrophilic, the second property is hydrophobic; and if the first property is hydrophilic, the second property is hydrophilic.

Referring to FIGS. 7 and 2B, a coating mask is provided, which has a plurality of through holes therein (Step 700). In Step 700, the used coating mask is, for example, the coating mask shown in the FIGS. 6A to 6F. The material of the coating mask is, for example, metal, rubber, plastic or ceramic.

Then, the gas diffusion medium 202 having the first property is placed on the coating mask (Step 702). The material of the gas diffusion medium 202 includes a porous material, for example, carbon paper, carbon cloth, carbon fiber material, metal foams, or metal netting. A hydrophilic process or a hydrophobic process is, for example, performed on the gas diffusion medium, such that the gas diffusion medium is hydrophilic or hydrophobic.

The micro porous layer slurry having the first property is formed on the gas diffusion medium 202 having the first property (Step 704). The process for forming the micro porous layer slurry having the first property on the gas diffusion medium 202 having the first property includes, for example, spraying coating, blade coating, or screen printing. The micro porous layer slurry having the first property includes a carbon material having a high conductivity, a dispersing agent, a solution and a hydrophile/hydrophobicizer. The hydrophilicity/hydrophobicity of the micro porous layer 204 can be controlled through the proportion of the hydrophile/hydrophobicizer in the micro porous layer slurry. Definitely, the micro porous layer slurry further includes a noble metal catalyst, such as Pt, Au, Ru, Rh, Pd, Pt—Ru or Pt-transient metal alloys. The Pt-transient metal alloys include Pt—Ru, Pt—Sn, Pt—Ru—W, Pt—Co, and Pt—Ru—Sn.

A heating and sintering step is performed (Step 706) to remove the solution in the micro porous layer slurry having the first property, so as to form the micro porous layer 208 having the first property. In this embodiment, Step 704 and Step 706 can be performed at the same time, or Step 706 is performed after Step 704.

The micro porous layer slurry having the second property is formed on the gas diffusion medium 202 having the first property (Step 708). The process for forming the micro porous layer slurry having the second property on the gas diffusion medium 202 having the first property includes, for example, spraying coating, blade coating, or screen printing. The micro porous layer slurry having the second property includes a carbon material having a high conductivity, a dispersing agent, a solution and a hydrophile/hydrophobicizer. The hydrophilicity/hydrophobicity of the micro porous layer can be controlled through the proportion of the hydrophile/hydrophobicizer in the micro porous layer slurry. Definitely, the micro porous layer slurry further includes a noble metal catalyst such as Pt, Au, Ru, Rh, Pd, Pt—Ru or Pt-transient metal alloys. The Pt-transient metal alloys include Pt—Ru, Pt—Sn, Pt—Ru—W, Pt—Co, and Pt—Ru—Sn.

Then, a penetrating step is performed (Step 710) to make the micro porous layer slurry having the second property penetrate into the gas diffusion medium 202 having the first property, and run through the gas diffusion medium 202 having the first property, in which the part of the gas diffusion medium 202 where the first micro porous layer slurry penetrates through is corresponding to the through holes of the coating mask. The penetrating step includes using the suction to fix the gas diffusion medium 202 and making the micro porous layer slurry having the second property penetrate into the gas diffusion medium having the first property. For example, the coating mask is disposed on the opening of the vacuum chamber body, and then, the vacuum pump is used to produce a suction in the vacuum chamber body, so as to make the micro porous layer slurry having the second property penetrate into the gas diffusion medium having the first property.

Then, a heating and sintering step is performed (Step 712) to remove the solution in the micro porous layer slurry having the second property, so as to form the micro porous layer 204 having a plurality of channel layers 206 and having the second property. A pattern constituted by the channel layers 206 depends upon the pattern constituted by the through holes. In this embodiment, Steps 708, 710, and 712 can also be performed at the same time, or Step 708 is performed before Steps 710 and 712.

Moreover, if it is intended to form the gas diffusion layer shown in FIG. 2A, it is only necessary to omit Step 704 and Step 706.

In the manufacturing method for the gas diffusion layer of the present invention, through using the coating mask, it is easy to form the channel layers in the gas diffusion medium (GDM), in which the channel layers have a hydrophilicity/hydrophobicity different from that of the gas diffusion medium (GDM). Moreover, by changing the pattern design of the coating mask, the gas diffusion layer having different hydrophilicity/hydrophobicity combinations can be produced quickly.

In the manufacturing method for the gas diffusion layer of the present invention, the step of coating the micro porous layer slurry, the step of penetrating the micro porous layer slurry, and the heating and sintering step can be performed at the same time, so that the micro porous layer structure and the channel layers can be formed quickly. This manufacturing method is simple and saves the manufacturing time.

Based on the above, in the gas diffusion layer of the present invention, since the micro porous layer penetrates into the gas diffusion medium (GDM) to form the channel layers having a 3-D structure, the adhesion between the micro porous layer and the gas diffusion medium can be greatly enhanced, such that the micro porous layer is not easily stripped off.

In the gas diffusion layer of the present invention, besides one or more micro porous layers (MPL) formed on the surface of the gas diffusion medium (GDM), a conductive channel layers are also formed in the through-plane direction by penetrating the micro porous layer into the gas diffusion medium (GDM). Therefore, the conductivity at the in plane and the through plane of the gas diffusion layer (GDL) can be greatly improved.

Since the gas diffusion layer of the present invention has different hydrophilic/hydrophobic structures and channels, the problem of flooding at the cathode, the problem of water deficit at the anode, and the problems of gas transfer can be solved at the same time.

Since the manufacturing method for the gas diffusion layer of the present invention has the coating mask and the vacuum system, it is easy to form the channel layers in the gas diffusion medium (GDM), which have a hydrophilicity/hydrophobicity different from that of the gas diffusion medium (GDM). Moreover, the gas diffusion layer (GDL) having different hydrophilicity/hydrophobicity combinations can be produced quickly by changing the pattern design of the coating mask.

Since the manufacturing apparatus for the gas diffusion layer has a heating apparatus, the heating and sintering process can be performed while the micro porous layer slurry is coated, so as to remove the solution in the slurry quickly, and thus, forming the micro porous layer structure and the channel layer quickly.

Since the manufacturing method for the gas diffusion layer of the present invention adopts the coating mask, it is easy to form the channel layers in the gas diffusion medium (GDM), which have a hydrophilicity/hydrophobicity different from that of the gas diffusion medium (GDM). Moreover, the gas diffusion layer having different hydrophilicity/hydrophobicity combinations can be produced quickly by changing the pattern design of the coating mask.

In the manufacturing method for the gas diffusion layer of the present invention, the step of coating the micro porous layer slurry, the step of penetrating the micro porous layer slurry and the heating and sintering step can be performed at the same time, so that the micro porous layer structure and the channel layers can be formed quickly. This manufacturing method is simple and can save the manufacturing time.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims and their equivalents.

What is claimed is:

1. A gas diffusion layer, comprising:
a gas diffusion medium having a first property;
a first micro porous layer having a second property, entirely covering a top surface of the gas diffusion medium, and having a plurality of channel layers penetrating through the gas diffusion medium, wherein one of the first property and the second property is hydrophilic, and the other is hydrophobic; and
a second micro porous layer having the first property, disposed on the surface of the gas diffusion medium, and located between the gas diffusion medium and the first micro porous layer.

2. The gas diffusion layer as claimed in claim 1, wherein the material of the gas diffusion medium comprises a porous material.

3. The gas diffusion layer as claimed in claim 2, wherein the material of the gas diffusion medium comprises carbon paper, carbon cloth, carbon fiber material, metal foams or metal netting.

4. The gas diffusion layer as claimed in claim 1, wherein the first micro porous layer is formed by a micro porous layer slurry with the solution and dispersion agent being removed.

5. The gas diffusion layer as claimed in claim 4, wherein the micro porous layer slurry comprises a carbon material with a high conductivity, a dispersing agent, a solution and a hydrophile/hydrophobicizer.

6. The gas diffusion layer as claimed in claim 5, wherein the micro porous layer slurry further comprises a layer of noble metal catalyst.

7. The gas diffusion layer as claimed in claim 6, wherein the noble metal catalyst is selected from a group consisting of Pt, Au, Ru, Rh, Pd, and Pt-transient metal alloys comprising Pt—Ru, Pt—Sn, Pt—Ru—W, Pt—Co, or Pt—Ru—Sn.

* * * * *